United States Patent
Goeusse et al.

(10) Patent No.: US 8,140,095 B2
(45) Date of Patent: Mar. 20, 2012

(54) RESOLVING ENCODING DEPENDENCIES FOR DATA BURSTS

(75) Inventors: Francois R. D. Goeusse, Grasse (FR); Francois Mazard, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 588 days.

(21) Appl. No.: 12/328,387

(22) Filed: Dec. 4, 2008

(65) Prior Publication Data

US 2009/0143083 A1 Jun. 4, 2009

(30) Foreign Application Priority Data

Dec. 4, 2007 (EP) .................................. 07291450

(51) Int. Cl.
*H04W 68/00* (2009.01)
(52) U.S. Cl. ........ 455/458; 455/515; 455/464; 455/574; 370/311; 370/329; 708/203

(58) Field of Classification Search ............... 455/458, 455/426.1, 515, 426, 464, 509, 516, 179.1, 455/343.1–343.4, 343, 574, 127.5; 370/311, 370/329; 708/203; 707/728, 741, 104.1; 713/300–340; 382/232–236; 375/240.03–240.16; 344/88

See application file for complete search history.

(56) References Cited

U.S. PATENT DOCUMENTS

| | | | |
|---|---|---|---|
| 5,941,983 A * | 8/1999 | Gupta et al. | 712/214 |
| 7,548,653 B2 * | 6/2009 | Olshansky et al. | 382/232 |
| 2001/0005423 A1 * | 6/2001 | Rhoads | 382/100 |
| 2002/0108087 A1 * | 8/2002 | Liu et al. | 714/765 |
| 2006/0121911 A1 * | 6/2006 | Zhang et al. | 455/452.2 |
| 2008/0014969 A1 * | 1/2008 | Laroia et al. | 455/458 |

* cited by examiner

*Primary Examiner* — Kamran Afshar
*Assistant Examiner* — Marisol Fahnert
(74) *Attorney, Agent, or Firm* — Alan A. R. Cooper; Wade James Brady, III; Frederick J. Telecky, Jr.

(57) ABSTRACT

A system comprises a receiver and a transmitter in wireless communication with the receiver. The receiver receives from the transmitter multiple bursts of data on a paging channel. First and second bursts of data comprise channel protocol information and paging mode data. The second burst comprises an encoding dependency that groups paging mode data independently of channel protocol information.

18 Claims, 3 Drawing Sheets

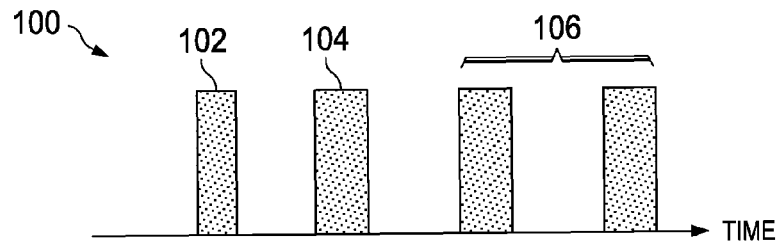
FIG. 1A
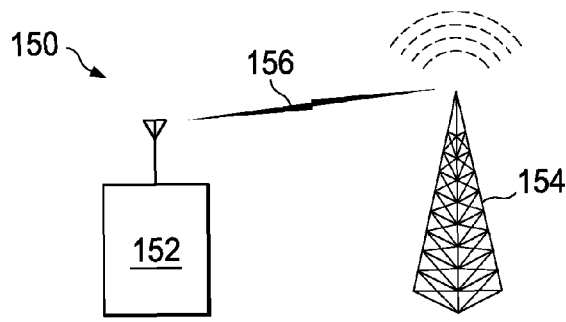
FIG. 1B
| CHANNEL NEEDED IE | 3 | 2 | 1 | 0 |
|---|---|---|---|---|
| ANY CHANNEL | 0 | 0 | 0 | 0 |
| SDCCH | 0 | 1 | 0 | 1 |
| TCH/F | 1 | 0 | 1 | 0 |
| TCH/H or TCH/F | 1 | 1 | 1 | 1 |
FIG. 2A
| PAGING TYPE IE | 3 | 2 | 1 | 0 |
|---|---|---|---|---|
| NORMAL PAGING | 0 | 0 | 0 | 0 |
| EXTENDED PAGING | 0 | 0 | 0 | 1 |
| PAGING REORGANIZATION | 0 | 0 | 1 | 0 |
| SAME AS BEFORE | 0 | 0 | 1 | 1 |
FIG. 2B

| ENCODING DEPENDENCY | BIT POSITION | |
|---|---|---|
| MsgType0, MsgType1, MsgType4 | 44 | ← 306 |
| MsgType4, MsgType5, PageMode0 | 30 | ← 308 |
| MsgType6, MsgType7, PageMode2 | 82 | ← 310 |
| PageMode0, PageMode1, Channel0 | 16 | ← 312 |
| PageMode2, PageMode3, Channel2 | 68 | ← 314 |

| ENCODING DEPENDENCY | BIT POSITION | |
|---|---|---|
| 356 → MsgType0, MsgType1, MsgType3, MsgType4 | 28 | |
| 358 → MsgType4, MsgType5, MsgType7, PageMode0 | 14 | |
| 360 → MsgType6, MsgType7, PageMode1, PageMode2 | 66 | |
| PageMode0, PageMode1, PageMode3, Channel0 | 0 | |
| 362 → PageMode2, PageMode3, Channel1, Channel2 | 52 | |
| 364 ↗ | | |

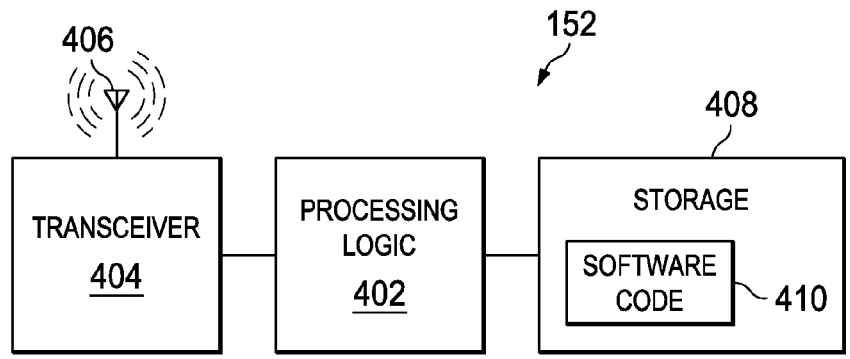

FIG. 4A

RESOLVING ENCODING DEPENDENCIES FOR DATA BURSTS

RELATED APPLICATIONS

This application claims priority to and incorporates by reference EP Patent Application No. 07291450.0, filed Dec. 4, 2007, entitled "GSM Idle in 1 Burst: Robust Method to Recognize the "Page Mode" IE," and is incorporated herein by reference in its entirety.

BACKGROUND

Mobile communication devices (MCDs) communicate wirelessly with other devices, such as base towers. Data is often transmitted in "bursts." Bursts contain various types of information that are encoded onto digital bits. These digital bits may indicate, for example, when a call is incoming, what type of channel should be used, etc. The bits are encoded using encoding dependencies so that information of type "A" (e.g., paging information) is derived using information of type "B" (e.g., channel information). However, the encoding dependencies make it difficult to decode information of type "A" from the burst bits if the information of type "B" is unknown.

SUMMARY

The problems noted above are solved in large part by a technique for resolving encoding dependencies for data bursts. In an illustrative embodiment, a system comprises a receiver and a transmitter in wireless communication with the receiver. The receiver receives from the transmitter multiple bursts of data on a paging channel. First and second bursts of data comprise channel protocol information and paging mode data. The second burst comprises an encoding dependency that groups paging mode data independently of channel protocol information.

Another illustrative embodiment includes a method, comprising a transmitter transmitting a data burst that includes paging mode information and channel selection information, the paging mode information and channel selection information in the data burst encoded independently of each other. The method also comprises a receiver receiving the data burst. The method further comprises resolving encoding dependencies in the data burst to determine the paging mode information and channel selection information in the burst.

Yet another illustrative embodiment includes a system that comprises means for receiving first and second data bursts and means for resolving encoding dependencies in the second data burst to produce results.

BRIEF DESCRIPTION OF THE DRAWINGS

For a detailed description of exemplary embodiments of the invention, reference will now be made to the accompanying drawings in which:

FIG. 1a shows an illustrative graph of data bursts, in accordance with embodiments;

FIG. 1b shows an illustrative wireless communication system, in accordance with embodiments;

FIG. 2a shows a table containing channel communication protocol bit combinations;

FIG. 2b shows a table containing paging mode bit combinations;

FIG. 3a shows a table containing encoding dependencies for a first data burst in a paging channel;

FIG. 3b shows another table containing different encoding dependencies for a second data burst in a paging channel, in accordance with preferred embodiments;

FIG. 4a shows an illustrative block diagram of circuit logic used to implement the technique described herein, in accordance with embodiments;

FIG. 4b shows an illustrative mobile communication device capable of housing the circuit logic shown in FIG. 4a.

NOTATION AND NOMENCLATURE

Figure 4B:
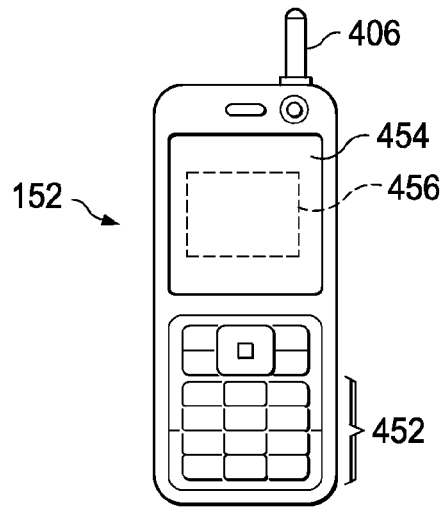

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections. The terms "mobile communication device," "handy," "cell phone," "personal digital assistant," etc. are not necessarily synonymous but generally refer to communication devices that operate wirelessly (e.g., using satellites, base stations, etc.).

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein is a technique whereby multiple types of information traditionally encoded into a single data burst are instead encoded onto multiple data bursts. When information is encoded onto multiple data bursts in this way, encoding dependencies are modified so that the multiple types of information mentioned above may be accurately decoded. In particular, the technique includes encoding sequential bursts of data with paging channel information and channel protocol/selection information in such a way as to facilitate the resolution of encoding dependencies between the paging channel and channel protocol information.

FIG. 1a shows an illustrative graph 100 of data bursts transmitted, for example, in a paging channel. The data bursts are illustrated in the order in which they are transmitted. Thus, the first data burst transmitted is data burst 102, followed by data burst 104 and multiple data bursts 106. In at least some embodiments, the paging channel may be established to wirelessly transmit information between a mobile communication device (e.g., a cell phone, a personal digital assistant (PDA)) and a base station. FIG. 1b shows a wireless communication system 150 comprising a mobile communication device 152, a base station 154 and a wireless channel 156 provided to transmit data therebetween. The bursts of data 102, 104 and 106 preferably are transmitted from the base station 154 to the communication device 152.

As mentioned, the data bursts 102 and 104 comprise channel selection information and paging information. Channel selection information comprises a plurality of bits that indicate the type of channel 156 that should be used to communicate between the communication device 152 and the base station 154. FIG. 2*a* shows a table 200 illustrative of bit combinations that cause the communication device 152 to communicate on different types of channels. The table 200 comprises rows 202, 204, 206 and 208 and columns 210, 212, 214, 216 and 218. The bit combination "0 0 0 0," shown in columns 212, 214, 216 and 218 of row 202, indicate to the communication device 152 that any type of channel communication protocol may be used. The bit combination "0 1 0 1," shown in columns 212, 214, 216 and 218 of row 204, indicate to the communication device 152 that an SDCCH channel communication protocol should be used. The bit combination "1 0 1 0," shown in columns 212, 214, 216 and 218 of row 206, indicate to the communication device 152 that a TCH/F channel communication protocol should be used. Finally, the bit combination "1 1 1 1," shown in columns 212, 214, 216 and 218 of row 208, indicate to the communication device 152 that a TCH/H or TCH/F communication protocol should be used. Channel communication protocols besides or in addition to those shown in FIG. 2*a* also may be used. Purposes of the channel communication protocol bits shown in FIG. 2*a* are described further below.

FIG. 2*b* shows a table 250 illustrative of bit combinations that are used to page the communication device 152. Specifically, the bit combinations shown in table 250 indicate to the communication device 152 the paging mode that the base station 154 may use to indicate to the communication device 152 that a call or other message is incoming. Row 252 of table 250 indicates that a normal paging mode is indicated by bits "0 0 0 0." Row 254 indicates that an extended paging mode is indicated by bits "0 0 0 1." Row 256 indicates that a paging reorganization is indicated by bits "0 0 1 0." Finally, as shown in row 258, the bits "0 0 1 1" indicate to the communication device 152 that the paging mode should not be changed and that the preceding paging mode should remain implemented. Purposes of the paging mode bits shown in FIG. 2*b* are described further below.

FIGS. 3*a* and 3*b* show various encoding dependencies that may be used to efficiently transmit information to the communication device 152. Before describing FIGS. 3*a* and 3*b*, however, encoding dependencies are briefly explained. In at least some embodiments, an encoding dependency is a scheme that is used to efficiently transmit multiple bits of information using a single digital bit. Encoding dependencies are used to encode data at the base station 154. Once received at the communication device 152, the single digital bit is decoded to produce the original, multiple bits of information. The digital bit is decoded using other single, digital bits that also are encoded with multiple bits of information. Specifically, a large number of such single, digital bits are aggregated to resolve the encoding dependency and to determine the values of the bits encoded within the single, digital bits. Encoding dependencies are often used, for example, in graphical applications to encode and decode individual pixels in a graphical image.

FIG. 3*a* shows a table 300 that illustrates how channel information, paging information and various other information may be encoded into a first data burst on a paging channel. For example, as shown, row 306 indicates that bit 44 in the first data burst is only encoded with miscellaneous information, including MsgType0, MsgType1 and MsgType4 (where MsgType[#] denotes a variable that represents a message type). These three items are encoded into a single bit using encoding dependencies. The bit may be decoded to produce the three distinct items (MsgType0, MsgType1 and MsgType4) by reversing the encoding dependencies, as described below. Likewise, as shown in row 308, bit 30 is encoded with MsgType4, MsgType5 and PageMode0 (where PageMode[#] denotes a variable that represents a paging mode, e.g., as shown in table 250). Row 310 indicates that bit 82 is encoded with MsgType6, MsgType7 and Pagemode2. Row 312 indicates that bit 16 is encoded with Pagemode0, Pagemode1 and Channel0 (where Channel[#] denotes a variable that represents a channel identifier, e.g., as shown in table 200). Finally, row 314 indicates that bit 68 is encoded with Pagemode2, Pagemode3 and Channel2.

Referring to FIGS. 2*a* and 3*a*, none of the channel communication protocol bits shown in table 200 may be predicted with absolute certainty. Each of the bits may be either a "0" or a "1," thereby causing the communication device 152 to implement different channel communication protocols. Because the channel communication protocol bits cannot be predicted with absolute certainty, the encoding dependencies shown in table 300 become difficult to resolve with accuracy. For example, row 312 indicates that bit 16 is encoded with Pagemode0, Pagemode1 and Channel0. If the value of Channel0 (i.e., column 218 of table 200) is unknown and cannot be predicted with absolute certainty, then the encoding dependency of row 312 cannot be resolved and the values of Pagemode0 and Pagemode1 cannot be determined.

However, in accordance with embodiments, table 350 of FIG. 3*b* shows an alternative set of encoding dependencies. The encoding dependencies in such embodiments may be resolved so that all, or almost all, of the communication channel protocol bits and the paging mode bits may be accurately determined. While the encoding dependencies shown in table 300 are implemented in first bursts of paging channels, the encoding dependencies shown in table 350 preferably are implemented in second bursts of paging channels. The encoding dependency scheme shown in table 350 is made possible at least in part by the realization that, unlike any of the channel communication protocol bits of table 200, two of the four paging mode bits of table 250 are always predictable, because they are always "0." Specifically, referring to table 250 in FIG. 2*b*, bits 3 and 2, shown in fields 262 and 264, respectively, are always "0." The encoding dependencies shown in table 350 leverage this fact so that all encoding dependencies may be resolved accurately. Thus, while the encoding dependency scheme shown in table 300 prevented the accurate determination of all paging mode bits, the encoding dependency scheme shown in table 350 enables the accurate determination of all paging mode bits. Specifically, PageMode0 (i.e., column 268 in table 250) may be determined using bit 14 (as shown in row 358 of table 350) because MsgType information always or almost always be accurately determined and because PageMode0 is encoded only with MsgType information. Similarly, PageMode1 (i.e., column 266 in table 250) may be determined using bit 66 (as shown in row 360 of table 350) because MsgType information always or almost always is accurately determinable and further because the value of PageMode2 (i.e., column 264 in table 250) is always known (i.e., "0"), as explained above.

An encoding dependency may be resolved, in some embodiments, using XOR operations. For example, referring to FIG. 3*b*, numeral 358, if MsgType4, MsgType5 and MsgType7 are known but Pagemode0 is unknown, the values for MsgType4, MsgType5 and MsgType7 may be subject to an XOR operation, the result of which is indicative of the value for Pagemode0. Other techniques for resolving encoding dependencies also may be used.

Thus, in this way, encoding a second data burst in a paging channel with encoding dependencies as shown in FIG. 3b enables the communication device 152 to resolve the encoding dependencies and to accurately determine the values of all communication channel protocol bits and paging mode bits.

FIG. 4a shows an illustrative block diagram of a mobile communication device 152 in which the above-described technique is implemented. The communication device 152 comprises processing logic (e.g., a processor) 402, a transceiver 404 coupled to an antenna 406, and storage 408 comprising software code 410. The software code 410, when executed by the processing logic 402, causes the processing logic 402 to implement the technique described above. FIG. 4b shows another view of the mobile communication device 152. The communication device 152 comprises the antenna 406, input device(s) 452, a display 454 and an electronics package 456 housed within the communication device 152. The electronics package 456 contains part or all of the circuit logic shown in FIG. 4a.

Figure 5:
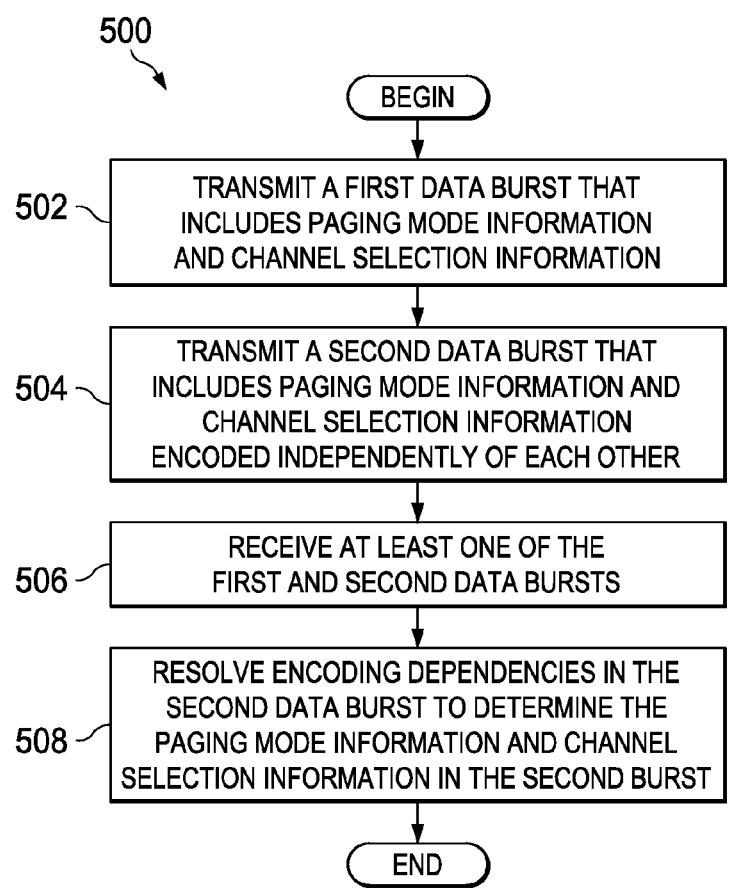
FIG. 5 shows a flow diagram of a method implemented in accordance with embodiments.

FIG. 5 shows a flow diagram of an illustrative method 500 implemented in accordance with embodiments. The method 500 begins by transmitting a first data burst that includes paging mode information and channel selection information (block 502). The method 500 includes transmitting a second data burst that includes paging mode information and channel selection information encoded independently of each other (block 504). The method 500 also includes receiving at least one of the first and second data bursts (block 506). The method 500 then comprises resolving encoding dependencies in the second data burst to determine the paging mode information and channel selection information in the second burst (block 508).

Although the above technique is described primarily in reference to a second received burst, in some embodiments, poor signal quality indications (e.g., bit error rate) that fall below a predetermined threshold may cause the technique to be applied to the first received burst instead of the second received burst. If, however, signal quality indications return to acceptable levels, the technique may again be applied to the second received burst. Other data bursts also may be used, and any and all such variations are encompassed within the scope of this disclosure.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a receiver; and
   a transmitter in wireless communication with the receiver, the receiver receives from the transmitter multiple bursts of data on a paging channel;
   wherein first and second bursts of data comprise channel protocol information and paging mode data;
   wherein the second burst comprises an encoding dependency that groups paging mode data independently of channel protocol information;
   wherein the paging mode data in the second burst comprises bits that are partitioned into multiple categories, a first and second of said categories are associated with "0" bits or "1" bits, a third and fourth of said categories are always associated with either only "0" bits or only "1" bits;
   wherein data bits associated with the categories are allocated into groups and transmitted from the transmitter to the receiver;
   wherein at least one of said groups comprises a data bit from at least one of the third and fourth categories and further comprises another data bit from one, but not both, of the first and second categories.

2. The system of claim 1, wherein the encoding dependency groups the paging mode data so that teach bit in the paging mode can be determined.

3. The system of claim 1, wherein the at least one group comprises data bits from the second and third categories but not from the first or fourth categories;
   wherein a second group comprises data bits from the first category but not from the second, third or fourth categories.

4. The system of claim 1, wherein the encoding dependency can be resolved to determine values of the data bits from the first, second, third and fourth categories.

5. The system of claim 1, wherein at least one of the transmitter and the receiver comprises a mobile communication device.

6. The system of claim 1, wherein the system transmits said second burst using ultra fast paging.

7. The system of claim 1, wherein the paging mode information indicates a target paging mode for communication between the transmitter and receiver and the channel protocol information indicates a target channel for communication between the transmitter and receiver.

8. A method, comprising:
   a transmitter transmitting a first data burst and a second data burst that includes channel selection information and paging mode information, respectively, the paging mode information and channel selection information in the first and second data bursts encoded independently of each other;
   a receiver receiving the first data burst and the second data burst; and
   resolving encoding dependencies between the first data burst and the second data burst to determine the paging mode information and channel selection information in the first data burst and the second data burst,
   wherein the paging mode information in the second burst comprises bits that are partitioned into multiple categories, a first and second of said categories are associated with "0" bits or "1" bits, a third and fourth of said categories are always associated with either only "0" bits or only "1" bits;
   wherein data bits associated with the categories are allocated into groups and transmitted from the transmitter to the receiver;
   wherein at least one of said groups comprises a data bit from at least one of the third and fourth categories and further comprises another data bit from one, but not both, of the first and second categories.

9. The method of claim 8, further comprising, prior to transmitting said first data burst and said second data burst, encoding the second data burst with groups of data bits associated with the paging mode information and channel selection information with the first data burst and the second data burst;
   wherein the data bits associated with the paging mode information of the second data burst are grouped separately from data bits associated with the channel selection information of the first data burst.

10. The method of claim 9, wherein said paging mode information in the second data burst indicates a paging mode using multiple bits, at least two of which are the same for all paging modes supported by the receiver.

11. The method of claim 8, wherein at least one of the transmitter and the receiver comprises a mobile communication device.

12. The method of claim 8, further comprising decoding said first data burst and said second data burst using single burst decode techniques.

13. The method of claim 8, wherein the paging mode information indicates a target paging mode for communication between the transmitter and receiver and the channel selection information indicates a target channel for communication between the transmitter and receiver.

14. A system, comprising:
 means for receiving first and second data bursts; and
 means for resolving encoding dependencies in the second data burst to produce results,
 wherein a paging mode data in the second burst comprises bits that are partitioned into multiple categories, a first and second of said categories are associated with "0" bits or "1" bits, a third and fourth of said categories are always associated with either only "0" bits or only "1" bits;
 wherein data bits associated with the categories are allocated into groups and transmitted from a transmitter to the means for receiving;
 wherein at least one of said groups comprises a data bit from at least one of the third and fourth categories and further comprises another data bit from one, but not both, of the first and second categories.

15. The system of claim 14, wherein said second data burst comprises paging mode information and channel selection information, said paging mode and channel selection information not used to encode a common bit.

16. The system of claim 14, wherein said first data burst comprises paging mode information and channel selection information, the paging mode and channel selection information used to encode a common bit.

17. The system of claim 14, wherein the system comprises a mobile communication device.

18. The system of claim 14, wherein the means for resolving the encoding dependencies in the second data burst is also for resolving encoding dependencies in the first data burst as a result of a signal quality indication that falls below a threshold.

* * * * *